(12) United States Patent
Kaupp et al.

(10) Patent No.: US 10,102,223 B2
(45) Date of Patent: Oct. 16, 2018

(54) APPARATUS AND METHOD FOR COMPARING TWO FILES CONTAINING GRAPHICS ELEMENTS AND TEXT ELEMENTS

(71) Applicant: EyeC GmbH, Hamburg (DE)

(72) Inventors: Ansgar Kaupp, Hamburg (DE); Dirk Luetjens, Hamburg (DE); Soeren Springmann, Hamburg (DE)

(73) Assignee: EyeC GmbH, Hamburg (DE)

( * ) Notice: Subject to any disclaimer, the term of this patent is extended or adjusted under 35 U.S.C. 154(b) by 712 days.

(21) Appl. No.: 14/398,362

(22) PCT Filed: May 2, 2013

(86) PCT No.: PCT/DE2013/000233
§ 371 (c)(1),
(2) Date: Feb. 3, 2015

(87) PCT Pub. No.: WO2013/163978
PCT Pub. Date: Nov. 7, 2013

(65) Prior Publication Data
US 2015/0213060 A1    Jul. 30, 2015

(30) Foreign Application Priority Data
May 2, 2012    (DE) .................. 10 2012 008 512

(51) Int. Cl.
*G06F 17/30*    (2006.01)
*G06K 9/00*    (2006.01)

(52) U.S. Cl.
CPC .. *G06F 17/30256* (2013.01); *G06F 17/30112* (2013.01); *G06F 17/30253* (2013.01); *G06K 9/00483* (2013.01)

(58) Field of Classification Search
CPC .......................................................... G06K 9/68
(Continued)

(56) References Cited

U.S. PATENT DOCUMENTS 5,142,619 A * 8/1992 Webster, III .............. G06F 7/02
                                                        715/234
6,397,213 B1    5/2002 Cullen et al.
(Continued)

FOREIGN PATENT DOCUMENTS

CN    1394313 A    1/2003
CN    1741034 A    3/2006
(Continued)

OTHER PUBLICATIONS

International Search Report of PCT/DE2013/000233, dated Oct. 4, 2013.
(Continued)

*Primary Examiner* — Kim T Nguyen
(74) *Attorney, Agent, or Firm* — Collard & Roe, P.C.

(57) ABSTRACT

To avoid occlusion of subordinate errors, so that the precise error is no longer identifiable, an apparatus for comparing two files containing graphics elements and text elements is proposed that contains a memory for the two files, means for splitting the two files into graphics elements and text elements, means for text recognition, raster graphics means for producing a rastered image from the graphics elements, means for comparing the extracted texts and means for comparing the rastered images and also means for, preferably jointly, outputting the two comparison results.

12 Claims, 7 Drawing Sheets

(58) Field of Classification Search
USPC .................................................. 707/706, 722
See application file for complete search history.

(56) References Cited

U.S. PATENT DOCUMENTS

| | | | |
|---|---|---|---|
| 6,940,995 | B2 | 9/2005 | Choi et al. |
| 2004/0202349 | A1 | 10/2004 | Erol et al. |
| 2005/0111052 | A1 † | 5/2005 | Nishikawa et al. |
| 2005/0268228 | A1* | 12/2005 | Buser .................... G06F 17/212 715/239 |
| 2006/0045340 | A1 | 3/2006 | Sakakibara et al. |
| 2007/0019864 | A1 | 1/2007 | Koyama et al. |
| 2008/0050016 | A1 | 2/2008 | Kawano et al. |
| 2009/0327505 | A1* | 12/2009 | Rao ....................... H04L 9/3236 709/230 |
| 2010/0228693 | A1* | 9/2010 | Dawson ............. G06F 17/2705 706/12 |
| 2011/0197121 | A1 † | 8/2011 | Kletter |
| 2011/0296321 | A1* | 12/2011 | Lord ...................... G06Q 10/00 715/760 |
| 2011/0304641 | A1* | 12/2011 | Grieves ................. G06K 9/036 345/590 |
| 2012/0007941 | A1* | 1/2012 | Meyer .................... H04M 3/51 348/14.08 |
| 2012/0177295 | A1* | 7/2012 | Gronau .................... G06K 9/03 382/218 |

FOREIGN PATENT DOCUMENTS

| | | |
|---|---|---|
| CN | 1900933 A | 1/2007 |
| CN | 101853246 A | 10/2010 |
| DE | 34 14 455 C2 | 4/1996 |
| DE | 101 32 625 A1 | 1/2003 |
| IL | 103 016 A | 11/1996 |
| JP | 2007-172077 A | 7/2007 |

OTHER PUBLICATIONS

German Office Action dated May 23, 2014 in German Application No. 10 2012 008 512.5 with English translation of relevant parts.
European Office Action dated Jun. 17, 2016 in European Application No. 13 727 028.6 with English translation of relevant parts.
English translation of Chinese Office Action dated Dec. 19, 2016 in Chinese Application No. 201380035062.X.
English translation of Japanese Office Action dated Jun. 20, 2017 in Japanese Application No. 2015-509304.

\* cited by examiner
† cited by third party

Fig. 2

Dummy text

Lorem ipsum dolor sit amet, consetetur sadipscing elitr, sed diam nonumy eirmod tempor invidunt ut labore et dolore magna aliquyam erat, sed diam voluptua. At vero eos et accusam et justo duo dolores et ea rebum. Stet clita kasd gubergren, no sea takimata sanctus est

Dummy text

Lorem ipsum dolor sit amet, consetetur sadipscing diam elitr, sed diam nonumy eirmod tempor invidunt ut labore et dolore magna aliquyam erat, sed diam voluptua At vero eos et accusam et justo duo dolores et ea rebum. Stet clita kasd gubargren, no sea takimata sanctus est

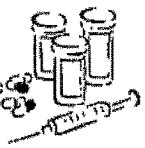

Dummy text

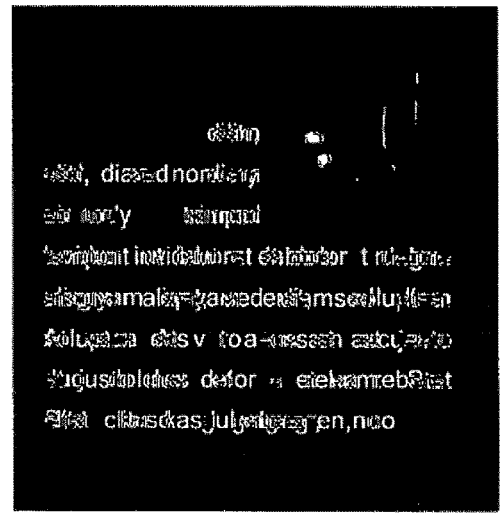

Dummy text 43      44

Fig. 6

Dummy text

```
56  <</ArtBox[164.726 288.03 430.555 553.859]/BleedBox[0.0 0.0 595.28 841.89]/Contents 13 0 R/MediaBo
57  endobj
58  13 0 obj
59  <</Length 623>>stream
60  /Layer /MC0 BDC
61  q
62  0 841.89 595.28 -841.89 re
63  W n
64  q
65  1 0 0 1 427.5547 420.9443 cm
66  0 0 0 0.3 k
67  /GS0 gs
68  0 0 m
69  0 -71.749 -58.164 -129.914 -129.915 -129.914 c
70  -201.664 -129.914 -259.829 -71.749 -259.829 0 c
71  -259.829 71.75 -201.664 129.915 -129.915 129.915 c
72  -58.164 129.915 0 71.75 0 0 c
73  f
74  Q
75  q
76  1 0 0 1 427.5547 420.9443 cm
77  0 0 0 1 K
78  6 w
79  /GS0 gs
80  0 0 m
81  0 -71.749 -58.164 -129.914 -129.915 -129.914 c
82  -201.664 -129.914 -259.829 -71.749 -259.829 0 c
83  -259.829 71.75 -201.664 129.915 -129.915 129.915 c
84  -58.164 129.915 0 71.75 0 0 c
85  h
86  S
87  Q
88  Q
89  BT
90  0 0 0 1 k
91  /GS0 gs
92  /TT0 1 Tf
93  36 0 0 36 203.6406 407.4907 Tm
94  [(Hello world!)]TJ
95  ET
96  EMC
97
98  endstream
```

43  44

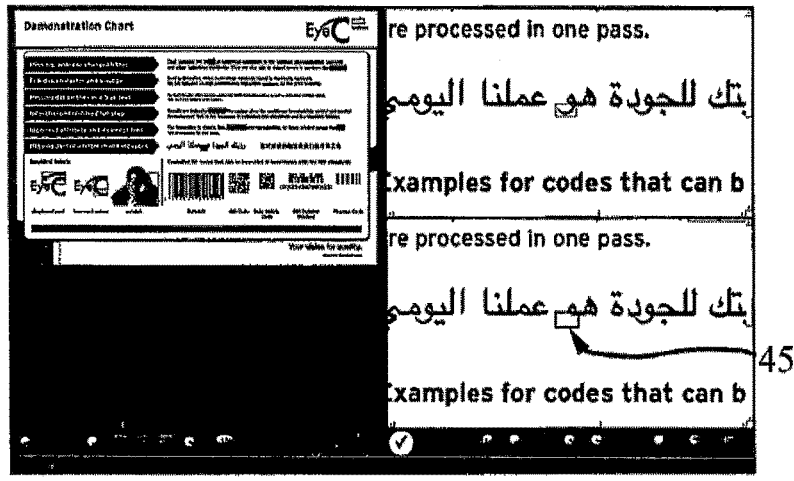
Fig. 7 — Dummy text
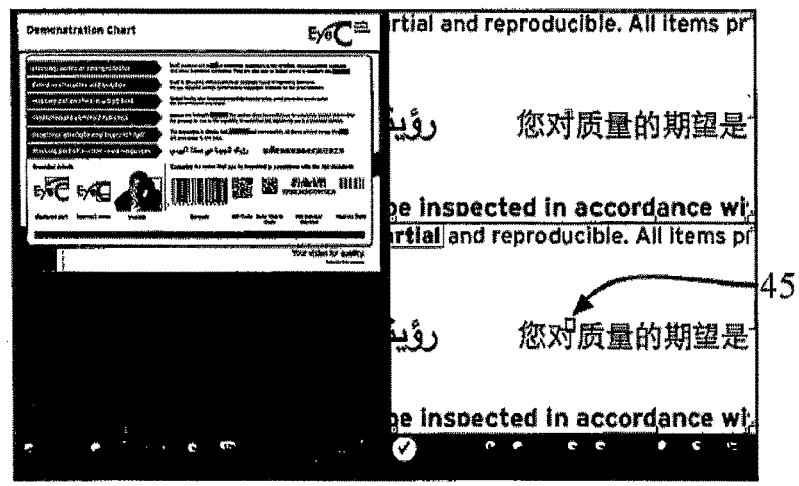
Fig. 8 — Dummy text
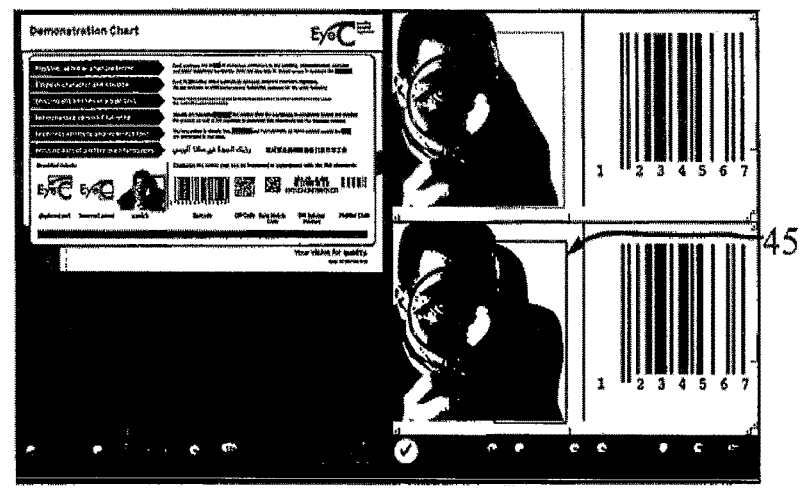
Fig. 9 — Dummy text

APPARATUS AND METHOD FOR COMPARING TWO FILES CONTAINING GRAPHICS ELEMENTS AND TEXT ELEMENTS

CROSS REFERENCE TO RELATED APPLICATIONS

This application is the National Stage of PCT/DE2013/000233 filed on May 2, 2013, which claims priority under 35 U.S.C. § 119 of German Application No. 10 2012 008 512.5 filed on May 2, 2012, the disclosure of which is incorporated by reference. The international application under PCT article 21(2) was not published in English.

The invention relates to an apparatus for the comparison of two files containing graphics and text elements.

Corresponding apparatuses are known from the prior art as text verification tools (TVT) or object verification tools (OVT). In the case of OVTs, an object comparison takes place by a pixel-by-pixel comparison of the two files, which if necessary are rendered beforehand for this purpose. For pure graphics elements of such files, very good results are obtained hereby, since any pixels deviating at that time can be detected and displayed immediately as errors. Such OVTs prove to be unsuitable for a text comparison, since, during the change of a text, line breaks or altered letter or word spacings are generated, which—even though no change has occurred—result immediately in deviations of the respective pixels and are displayed as errors. The latter does not happen during text verification, in which case a text is first extracted from the respective files, for which purpose, for example, OCR programs known in themselves may be used. Likewise, for text recognition, text can first be separated by extraction from more complex files, such as, for example, pdf, PostScript, Word files, with file elements defined appropriately as text. Furthermore, for TVTs—depending on file type—the text stream or text flow is also leveled, which is necessary in particular for text in several columns or else paragraph or line numbers positioned before the text or header or footer entries disposed at the top or bottom, as well as marginal numbers, in order to permit a comparison of contents or text. Thereafter, however, any text change can be detected and displayed rapidly and precisely by such text comparison tools. Nevertheless, such text comparison tools have the disadvantage that graphics cannot be compared, and so ultimately an overall comparison, namely that an identical image does or does not exist, is possible at best here.

In both cases, therefore, an occlusion of subordinate errors occurs, and so the exact error is no longer detectable. Accordingly, it is the task of the present invention to avoid this disadvantage in methods and apparatuses of the class in question.

As the solution, apparatuses and methods with the features of the independent claims are proposed.

Thus an apparatus for the comparison of two files containing graphics and text elements can be characterized by a memory for the two files, means for the splitting of the two files into graphics and text elements, means for the text recognition, raster graphics means for the generation of a rastered image from the graphics elements, means for the comparison of the extracted text and means for the comparison of the rastered images as well as means for the output, preferably together, of the two comparison results.

A method for the comparison of two files containing graphics and text elements can also be characterized in that graphics elements and text elements are split in both files and in that a respective raster image is generated if necessary from the graphics elements and the raster graphics are compared graphically with one another and the respective text is recognized if necessary from the text elements and the texts are compared textually with one another.

By the prior splitting into graphics elements and text elements, it is therefore possible for the first time to subject each of the elements separately to a review suitable for the purpose or to a comparison suitable for the purpose, which has the advantage that a corresponding comparison also leads to a correspondingly meaningful result and results that can be interpreted meaningfully.

In this connection it will be understood that a generation of a raster image is necessary only when the corresponding file does not already have a raster format. Likewise, a corresponding text recognition may not be required when the file already has text present in pure form. This is more likely to involve photographs, however, especially in everyday professional business practice, for example during preparation of proof copies and their discussion, since the files used there are frequently graphic container formats, such as, for example, pdf files or PostScript files.

In principle it is of advantage when, for the splitting of the graphics and text elements, the text elements are first separated and preferably placed in a separate plane. This can be achieved, for example, by applying text recognition programs, such as OCR, for example, via files existing in the raster format. The text recognized in this case is then placed appropriately in a separate plane and preferably removed from the graphics plane. If necessary, a plane containing only graphics can also be prepared in other ways, for example by transferring all elements that are not text elements into an appropriate graphics plane. If the text is present in a graphics container format, it is possible, for example, to flag zones of the graphics container format marked as text elements accordingly and then place them in the separate text plane.

Thereupon a direct text recognition takes place, wherein, for this purpose, glyphs present in the graphic container format are if necessary assigned letters via tables known in themselves, in order to recognize the text as such, in order then to convert the text by a text flow to an nhro text (natural human reading order). Hereby texts in column or table notation and the like are assembled as contextually meaningful units, which ultimately is already adequately known from the prior art in TVTs. In particular, it will be understood that the reading or flow directions of these texts can be adapted to the respective language, for example also from left to right and only then from top to bottom or from top to bottom and only then from right to left. Any changes to the text can then be compiled and presented in a manner that is immediately understandable and clear for humans.

Accordingly, it is also of advantage when the corresponding text recognition means comprise means for the extraction of the text from the text elements as well as means for the presentation of a text flow.

In this case the text recognition may lead to a text in the text plane or else even to a text in a separate nhro text plane.

It will be understood that, in the case of appropriate container formats, which already contain separate texts, it is possible to dispense with a complex text recognition in which these texts are extracted selectively from the respective container format. In practice, however, at least one of the files to be compared will not exist in such a format or possibly will even exist in such a format but will not contain separate texts, so that the complex text recognition explained in the foregoing will have to be performed first.

If the graphics elements do not already exist in raster form, it is of advantage when these are rendered to a raster image, i.e. are transformed into a raster image. In this connection it will be understood that the corresponding raster image can be presented if necessary in the main plane of the respective file or else in the graphics plane or an additional raster image plane.

For the rendering, the raster graphics means may comprise in particular a raster graphics engine and/or even a raster graphics processor. Hereby a corresponding rastering or a corresponding rendering can be performed rapidly and operationally reliably with the desired precision.

Preferably the comparison results will be presented together, which can be achieved, for example, by superposing appropriate planes. In particular, the comparison results can be displayed on a monitor as the output means.

Likewise it is conceivable to save the comparison results, preferably together, in a file that can then be made available, for example, to a customer, for verification of the implemented changes, for example in a proof copy. Accordingly, it is of advantage when the output means comprise a memory and storage means for saving the comparison results in a results file in the memory.

The comparison results can be further processed particularly advantageously when the storage means save the results file in the format of at least one of the two files to be compared. Hereby it can be ensured that the associated programs that are necessary for opening and if necessary evaluating this results file are also available to the persons who have prepared at least one of the files that are to be compared.

It will be understood that the features of the solutions described in the foregoing or in the claims can also be combined if necessary, in order to be able to implement the advantages appropriately cumulatively.

Further advantages, goals and properties of the present invention will be explained on the basis of the following description of exemplary embodiments, which in particular are also illustrated in the attached drawing, wherein:

FIG. 2 shows two files to be compared containing graphics and text elements, and the result of the comparison according to conventional object verification;

FIG. 6 shows the file illustrated in FIGS. 4 and 5 in text format;

FIG. 7 shows an example of the comparison of a file containing Chinese text elements;

FIG. 8 shows an example of the comparison of a file containing Arabic text elements; and FIG. 9 shows an example of the comparison of a file containing graphics elements.

Figure 1:
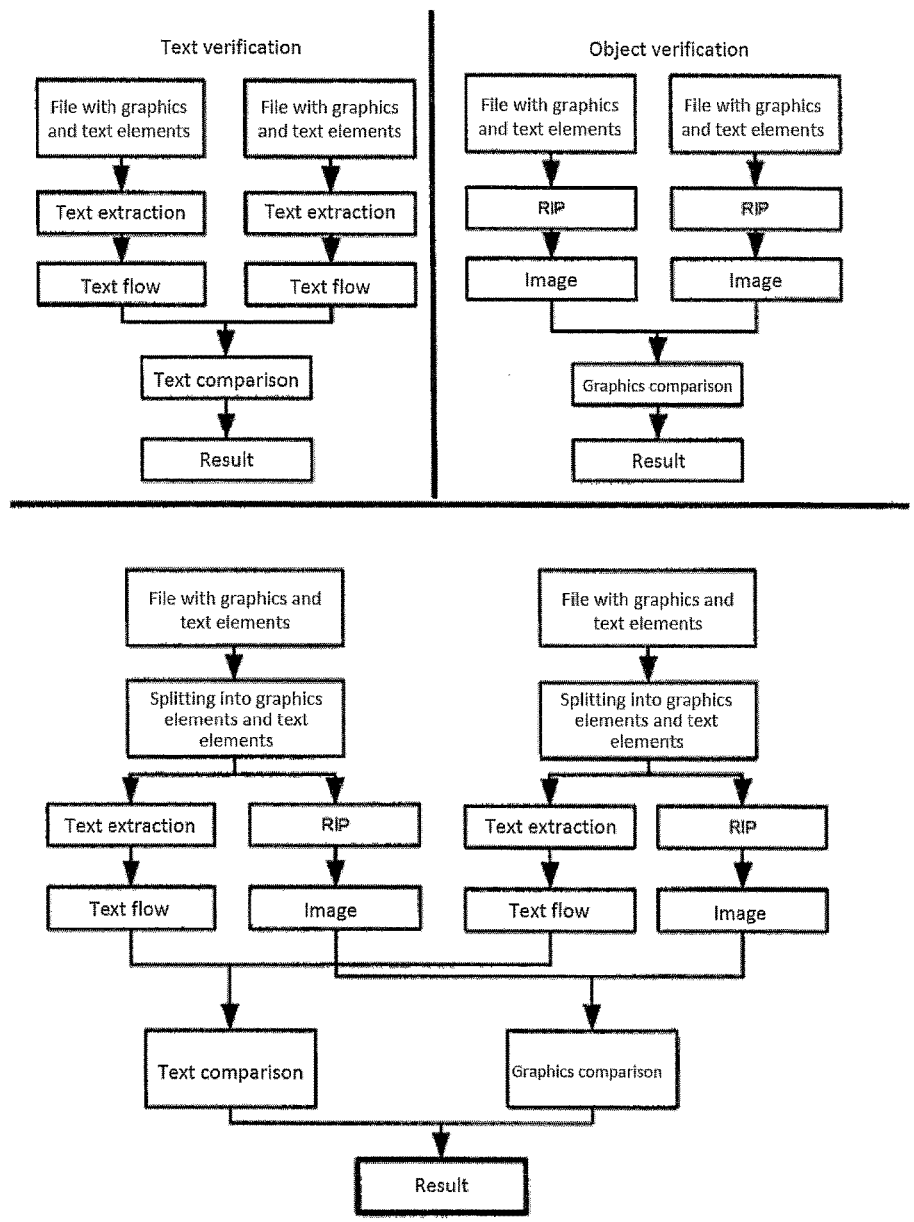
FIG. 1 shows in the lower part the process flow according to the invention and in the upper part the process flows according to the prior art.
Figure 3:
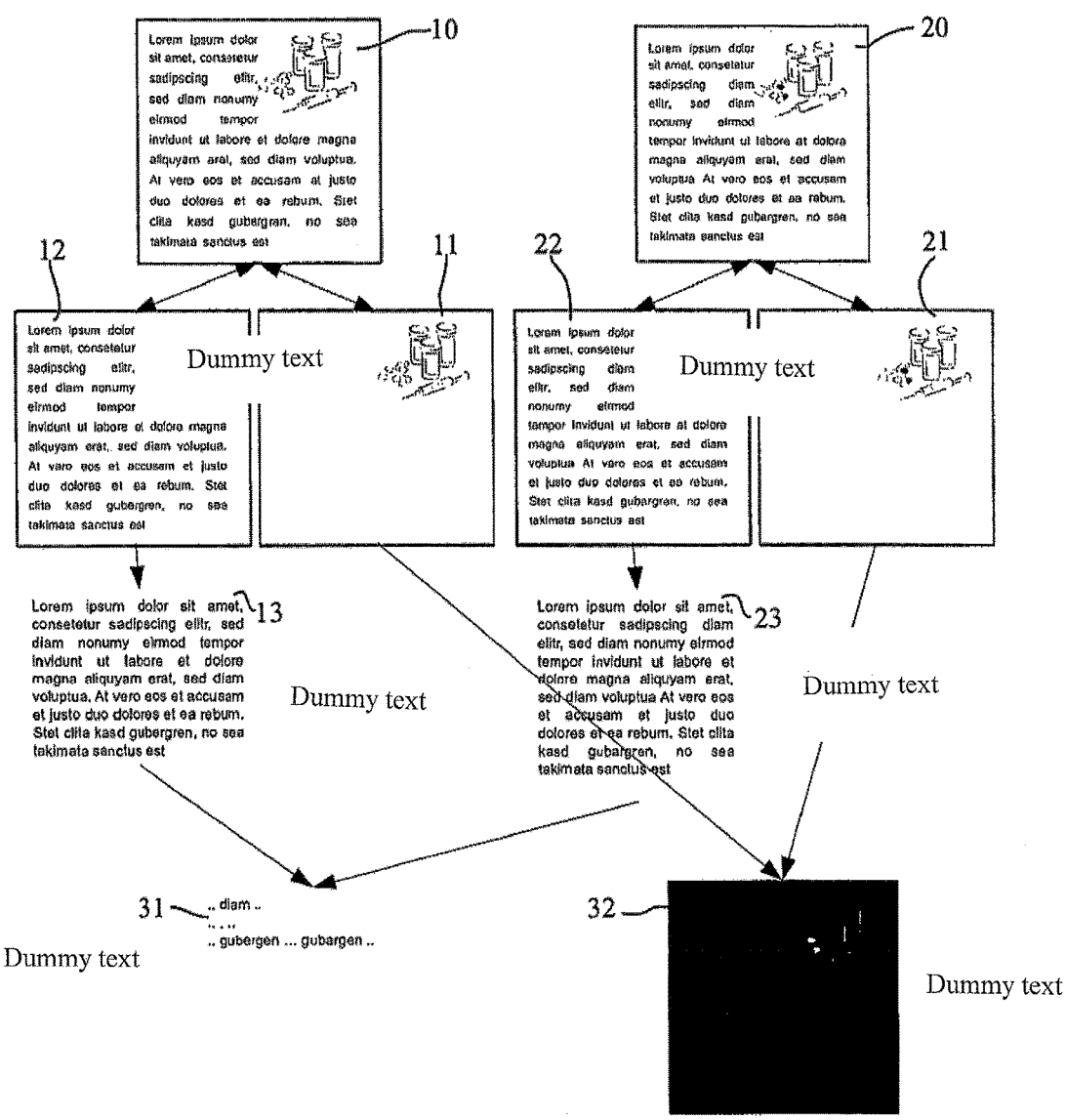
FIG. 3 shows the process flow according to the invention and its result on the basis of the files to be compared in FIG. 2.

By the splitting of the files 10, 20 to be compared, with graphics elements and text elements, which files are respectively separated into graphics planes 11, 21 and text planes 12, 22, a separate text comparison and a separate graphics comparison can be performed first, which then leads to correspondingly sensible and understandable results. If necessary, the two files 10, 20 to be compared or even only one of these files 10, 20 can be subjected in a first step to a text recognition, such as, for example, an OCR, or to another process which searches for objects or creates objects that contain text, in order in this way to prepare firstly, from a purely graphics file 10, 20, a file 10, 20 in which text elements can also be found in a container format.

After the separation, the graphics planes 11, 21 are rendered and compared, wherein the result of the graphics comparison is presented in a separate plane 32.

In the text planes 12, 22, a text recognition and a text flow are first applied, so that respective text 13, 23 is available for a textual comparison, the result of which is then presented in a plane 31.

In this way a document comparison or file comparison can be performed rapidly and operationally reliably, especially in the case of proof copies, in which customer-specific requests for change are to be made together with documentation of the changes.

By an overlapping of the planes 31 and 32, an overall image can also be compiled directly, if necessary by inverting the image 32, which uniformly documents the corresponding errors.

The latter, as illustrated in FIG. 2, is not possible in an object verification, since an occlusion of errors occurs in this case. Likewise it will be directly understandable that a text verification cannot enable a graphics comparison.

Figure 4:
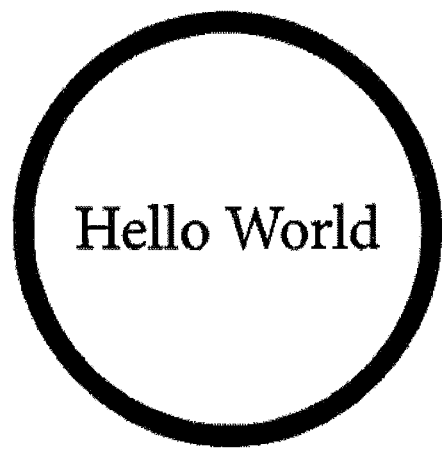
FIG. 4 shows a printed image of an exemplary pdf file containing graphics and text elements.
Figure 5:
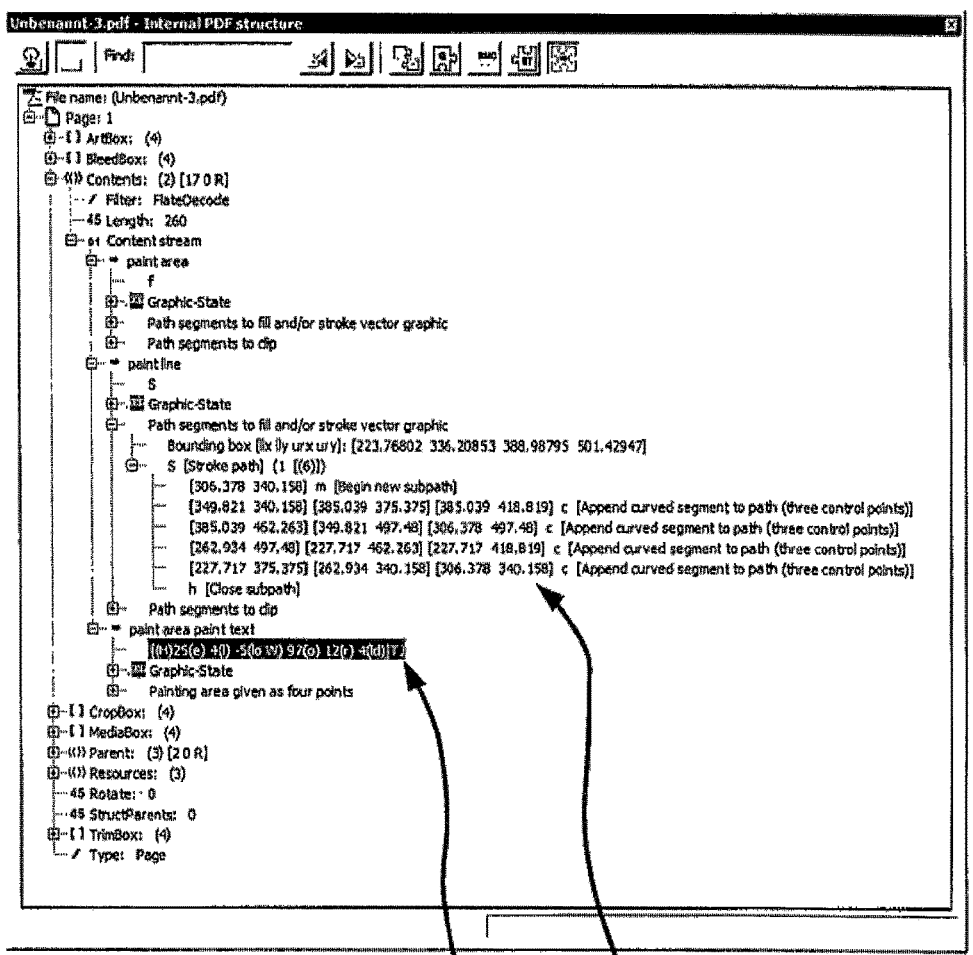
FIG. 5 shows the file illustrated in the printed image of FIG. 4 in a structure representation.

In this connection, the files can be converted, for example, into a container format, such as pdf. Text and graphics elements 43, 44 are perceptible in such a format. Thus in the file which is illustrated in FIG. 4 in the printed image and which contains a circle as the graphics element 44 and "Hello World" as the text element 43, the text can be found separately from the graphics, and in particular can be inferred from the structure representation of this file illustrated in FIG. 5. Not quite as obviously, the corresponding information items are also contained in the text presentation (see FIG. 6) of the respective file, and so the text elements can be computationally separated appropriately from the graphics elements and, as illustrated in the foregoing, can be reviewed.

In this connection it will be understood that the text elements are not absolutely limited to Latin characters. Likewise, other written languages, such as Arabic or Chinese, can be examined and compared accordingly, as illustrated by way of example in FIGS. 7 and 8, wherein—depending on language or typeface—the reading direction must be adapted for this purpose, although, because of the appropriate embedding of the text, this usually does not represent any problem. In this case also, missing or erroneous parts 45 can also be marked appropriately if necessary, so that a simpler and operationally more reliable comparison can be made.

Erroneous or defective parts 45 in graphics can also be marked appropriately, as illustrated by way of example in FIG. 9.

| Reference Symbol List: | |
|---|---|
| 10 | file |
| 11 | graphics plane |
| 12 | text plane |
| 13 | text |
| 20 | file |
| 21 | graphics plane |
| 22 | text plane |
| 23 | text |

-continued

| Reference Symbol List: | |
|---|---|
| 31 | plane for the result of the text comparison |
| 32 | plane for the result of the graphics comparison |
| 43 | text zone of the file |
| 44 | graphics zone of the file |
| 45 | missing or erroneous text |

The invention claimed is:

1. Apparatus for the comparison of a first file and a second file containing graphics and text elements, the apparatus comprising
   a memory for the first and second files,
   means for
      the splitting of the first file into a first file graphics portion containing the graphics of the first file and a first file text element portion containing the text elements of the first file, and
      the splitting of the second file into a second file graphics portion containing the graphics of the second file and a second file text element portion containing the text elements of the second file,
   means for the text recognition,
   raster graphics means for the generation of a respective rastered image from the graphics elements of the first file graphics portion and of the second file graphics portion,
   means for the comparison of the extracted text elements of the first file text element portion with the extracted text elements of the second file text element portion,
   means for the comparison of the rastered images, and
   means for the output, preferably together, of the two comparison results.

2. Apparatus according to claim 1, wherein the raster graphics means comprise a raster graphics engine and/or processor.

3. Apparatus according to claim 1, wherein the output means comprise a memory and storage means for saving the comparison results in a results file in the memory.

4. Apparatus according to claim 3, wherein the storage means save the results file in the format of at least one of the first and second files to be compared.

5. Apparatus according to claim 1, wherein the output means comprise a monitor.

6. Apparatus according to claim 1, wherein text recognition means comprise means for the extraction of the text from the text elements as well as means for the presentation of a text flow.

7. Method for the comparison of first and second files containing graphics and text elements, the method comprising:
   splitting graphics elements of the first file from text elements of the first file,
   splitting graphics elements of the second file from text elements of the second file,
   after the splitting, generating a raster image if necessary from the graphics elements of the first file,
   after the splitting, generating a raster image if necessary from the graphics elements of the second file,
   comparing the raster graphics graphically with one another,
   after the splitting, recognizing if necessary the text from the text elements of the first file,
   after the splitting, recognizing if necessary the text from the text elements of the second file, and
   comparing the texts textually with one another.

8. Method according to claim 7, wherein the two comparison results are presented together.

9. Method according to claim 8, wherein the comparison results are saved together in one file.

10. Method according to claim 7, wherein at least one of the graphics elements is rendered to a raster image.

11. Method according to claim 7, wherein, for the splitting of the graphics and text elements, the text elements are first placed in a separate plane.

12. Method according to claim 7, wherein an nhro text is generated for text recognition by a text flow.

* * * * *